(12) United States Patent
Gandhi et al.

(10) Patent No.: US 10,389,529 B2
(45) Date of Patent: Aug. 20, 2019

(54) ENTROPY-BASED AUTHENTICATION OF MOBILE FINANCIAL TRANSACTION

(71) Applicant: Uniken, Inc., Chatham Township, NJ (US)

(72) Inventors: Bimal I. Gandhi, Chatham, NJ (US); Nishant Kaushik, Jersey City, NJ (US); Robert Alan Levine, San Diego, CA (US); James Anthony Villarrubia, Jersey City, NJ (US); Tejas Digambar Limaye, Pune (IN)

(73) Assignee: Uniken, Inc., Chatham Township, NJ (US)

( * ) Notice: Subject to any disclaimer, the term of this patent is extended or adjusted under 35 U.S.C. 154(b) by 0 days.

(21) Appl. No.: 16/018,775

(22) Filed: Jun. 26, 2018

(65) Prior Publication Data

US 2018/0375860 A1 Dec. 27, 2018

Related U.S. Application Data

(60) Provisional application No. 62/525,348, filed on Jun. 27, 2017, provisional application No. 62/525,351, filed on Jun. 27, 2017.

(51) Int. Cl.
| | |
|---|---|
| *H04L 29/06* | (2006.01) |
| *H04L 9/08* | (2006.01) |
| *H04W 12/06* | (2009.01) |
| *H04W 12/04* | (2009.01) |

(Continued)

(52) U.S. Cl.
CPC ........ *H04L 9/0861* (2013.01); *G06F 21/602* (2013.01); *G06F 21/606* (2013.01); *H04L 9/0819* (2013.01); *H04L 9/14* (2013.01); *H04L 63/0428* (2013.01); *H04L 63/062* (2013.01); *H04L 63/0869* (2013.01); *H04W 12/04* (2013.01); *H04W 12/06* (2013.01); *H04L 9/08* (2013.01); *H04L 9/085* (2013.01); *H04L 63/08* (2013.01); *H04L 63/12* (2013.01); *H04L 63/18* (2013.01)

(58) Field of Classification Search
CPC ..... H04L 63/0869; H04L 9/0819; H04L 9/14; H04L 63/12; G06F 21/602
See application file for complete search history.

(56) References Cited

U.S. PATENT DOCUMENTS

| | | | |
|---|---|---|---|
| 2006/0090067 A1* | 4/2006 | Edmonds | H04L 63/083 713/159 |
| 2008/0022091 A1* | 1/2008 | Deshpande | H04L 63/0428 713/157 |

(Continued)

*Primary Examiner* — John B King

(57) ABSTRACT

A method for leveraging a secure communication channel between a first agent and a second agent to authenticate an activity outside of the secure communication channel. The method includes receiving with the first agent a communication request through an insecure channel from the second agent. The method further includes receiving with the first agent an indicator of a relative identity relationship from the second agent. The method further includes sending with the first agent a request to authenticate the activity outside of the secure communication channel to the second agent. The method further includes authenticating the activity outside of the secure communication channel using the secure communication channel.

20 Claims, 8 Drawing Sheets

(51) Int. Cl.
*G06F 21/60* (2013.01)
*H04L 9/14* (2006.01)

(56) References Cited

U.S. PATENT DOCUMENTS

| | | | | |
|---|---|---|---|---|
| 2008/0091618 A1* | 4/2008 | Obrea | ............... | G06F 21/31 |
| | | | | 705/76 |
| 2010/0005294 A1* | 1/2010 | Kostiainen | ......... | H04B 10/1143 |
| | | | | 713/168 |
| 2010/0119063 A1* | 5/2010 | Deshpande | ......... | H04L 63/0428 |
| | | | | 380/44 |
| 2013/0298209 A1* | 11/2013 | Targali | ............... | H04L 63/0815 |
| | | | | 726/6 |
| 2015/0124945 A1* | 5/2015 | Kurapati | ............... | H04L 63/126 |
| | | | | 379/88.02 |

\* cited by examiner

ENTROPY-BASED AUTHENTICATION OF MOBILE FINANCIAL TRANSACTION

CROSS-REFERENCE TO RELATED APPLICATION AND CLAIM OF PRIORITY

This application claims priority to U.S. Provisional Application No. 62/525,348, filed Jun. 27, 2017, entitled "ENTROPY-BASED AUTHENTICATION OF MOBILE FINANCIAL TRANSACTION," which is hereby incorporated herein by reference in its entirety. This application further claims priority to U.S. Provisional Application No. 62/525,351, filed Jun. 27, 2017, entitled "METHOD FOR LEVERAGING A SECURE TELECOMMUNICATION SESSION," which is likewise hereby incorporated herein by reference in its entirety.

BACKGROUND

The present disclosure is related to methods for leveraging secure communication channels established by using two-way authentication between the entities involved in the communication.

Customers and service providers often must make transactions across secure telecommunication connections (e.g. a web browsing session or a telephone call). A connection between the customer and the service provider relies on authentication processes to validate the identity of the customer and the identity of the service provider before beginning an interaction between the customer and the service provider. Presently, each of such telecommunications connections between the customer and the service provider is initiated as if it were a first contact between the customer and the service provider. For example, when a customer uses the web browser to navigate to the service provider's website, the customer relies on the web browser to verify that the service provider's website is genuine before establishing an encrypted connection between the web browser and the service provider's website. After the web browser has validated the service provider's website, the web browser establishes an encrypted connection with the service provider's website. After the encrypted connection has been established, the customer sends personal identifying information, such as a username and a password, over the encrypted connection to confirm the customer's identity to the service provider's website.

The process of browser-run authentication described above is complicated and requires many intermediate, often third-party, validation steps using certificates. The certificates are easy to falsify and therefore a risk that the validation process will be compromised is inherent in each step of the validation process. If the validation process is compromised, the encryption key, and therefore any information sent across the encrypted connection, may therefore be accessed by a hacker. Another drawback of the web browser-run verification process is that the service provider's website often uses the same encryption key to establish every encrypted connection with every web browser requesting a secure connection with the website of the service provider. Accordingly, if even a single communication between the service provider's website and the customer's browser is intercepted by a hacker, all subsequent communication for all customers occurring over telecommunication connections encrypted using the encryption key are compromised.

The customer may also make transactions with the service provider using a telephone call into a call center of the service provider. When the customer calls the call center of the service provider, the customer is required to validate his or her identity by providing personal identifying information, such as a birthdate, a social security number, an address, or historical family information to a call center employee. While the call center may thus verify an identity of the customer based on the personal identifying information provided, the customer has no way to verify that the call center employee is a genuine call center employee associated with the service provider. Furthermore, the customer has no way to prevent the call center employee from stealing the customer's personal identifying information.

In the examples described above, the customer and the service provider have a pre-existing relationship (e.g. the customer has already signed up for the service provided by the service provider), yet this pre-existing relationship is not leveraged to authenticate the customer during transactions that occur after the initial encounter between the customer and the service provider. Instead, the customer is required to provide many pieces of personal identifying information for every interaction between the customer and the service provider, as is described above for the customer calling the call center. Alternatively, the service provider may require the customer to make an account that is accessible by a username and a password with the service provider. The account includes the personal identifying information of the customer. However, since the validation process completed by the browser before establishing the encrypted connection has many points of weakness, meaning that information such as the username or the password sent by the user over the encrypted connection may be intercepted.

SUMMARY

The disclosure provides various methods for leveraging a pre-existing relationship between a first agent and a second agent to establish a secure communication channel between the first agent and the second agent. This secure communication channel is then leveraged to authenticate subsequent interactions between a user associated with the first agent and a user associated with the second agent without the exchange of personal identifying information of either of the users or either of the agents over a potentially vulnerable connection.

In another embodiment, the disclosure provides a method for leveraging a secure communication channel between a first agent and a second agent to authenticate an activity outside of the secure communication channel. The method includes establishing the secure communication channel by a method comprising: a first computing device generating a first absolute key for the first agent; generating a first partial relative key for the first agent; wherein the first absolute key and the first partial relative key define a relative identity of the first agent, wherein the relative identity is unique for a relationship between the first agent and the second agent; generating an intermediate key by taking a mathematical function, hash, or algorithm of the first absolute key, the first partial relative key, and a second partial relative key for the second agent; generating an encryption key by using a mathematical function, hash, or algorithm of the intermediate key and a second absolute key for the second agent; wherein the relative identity relationship is characterized by the encryption key, and the encryption key is used to encrypt subsequent communications between the first agent and the second agent. Responsive to one of the first agent and the second agent receiving a request from the other of the first agent and the second agent to authenticate the activity outside of the secure communication channel, the method further includes authenticating the activity outside of the secure communication channel using the secure communication channel.

In another embodiment, the disclosure provides a method for leveraging a secure communication channel between a first agent and a second agent to authenticate an activity outside of the secure communication channel. The method includes receiving with the first agent a communication request through an insecure channel from the second agent. The method further includes receiving with the first agent an indicator of a relative identity relationship from the second agent. The method further includes sending with the first agent a request to authenticate the activity outside of the secure communication channel to the second agent. The method further includes authenticating the activity outside of the secure communication channel using the secure communication channel.

Other aspects of the invention will become apparent by consideration of the detailed description and accompanying drawings.

DETAILED DESCRIPTION

Figure 1:
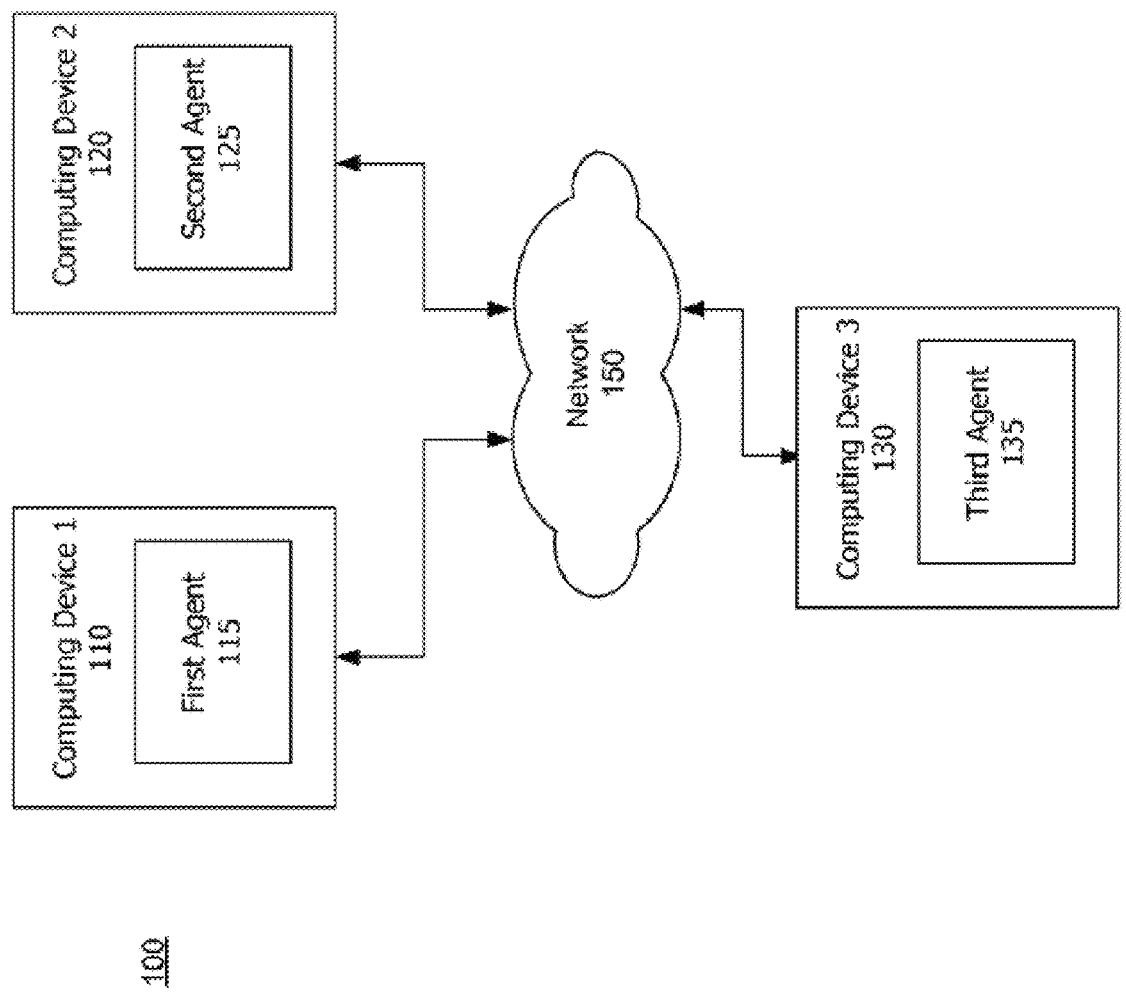
FIG. 1 is a block diagram of a system in which secure trustworthy two-way communication channels may be established and used according to some embodiments.

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting. The use of "including", "comprising", or "having" and variations thereof herein is meant to encompass the items listed thereafter and equivalents thereof as well as additional items. As used herein, the word "may" is used in a permissive sense (e.g. meaning having the potential to) rather than the mandatory sense (e.g. meaning must).

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared, or otherwise manipulated. It has been proven convenient at times, principally for reasons of common usage, to refer to signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, the terms "processing", "computing", "calculating", "determining" or the like refer to actions or processes of a specific apparatus, such as a special purpose computer or a similar special purpose electronic computing device. In the context of this specification, therefore, a special purpose computer or similar special purpose electronic computing device is capable of manipulating or transforming signals, typically represented as physical electronic or magnetic quantities within memories, registries, or other information storage devices, transmission devices, or display devices of the special purpose computer or similar special purpose electronic computing device. The use of the variable "n" is intended to indicate that a variable number of local computing devices may be in communication with the network.

Some embodiments include method for leveraging a secure communication channel between a first agent and a second agent to authenticate an activity outside of the secure communication channel. In some embodiments, the method includes establishing the secure communication channel a first computing device generating a first absolute key for the first agent. In some embodiments, the method further includes generating a first partial relative key for the first agent, wherein the first absolute key and the first partial relative key define a relative identity of the first agent. In some embodiments, the relative identity is unique for a relationship between the first agent and the second agent. In some embodiments, the method includes generating an intermediate key by taking a mathematical function, hash, or algorithm of the first absolute key, the first partial relative key, and a second partial relative key for the second agent.

In some embodiments, the method includes generating an encryption key by using a mathematical function, hash, or algorithm of the intermediate key and a second absolute key for the second agent. In some embodiments, the relative identity relationship is characterized by the encryption key, and the encryption key is used to encrypt subsequent communications between the first agent and second agent. In some embodiments, the method includes, responsive to one of the first agent and the second agent receiving a request from the other of the first agent and the second agent to authenticate the activity outside of the secure communication channel, authenticating the activity outside of the secure communication channel using the secure communication channel.

In some embodiments, the activity outside of the secure communication channel occurs on a browser. In some embodiments, the activity outside of the secure communication channel occurs on a telephone. In some embodiments, the activity outside of the secure communication channel is an in-person transaction. In some embodiments, the activity outside of the secure communication channel is authorized without sending an identity of either the first agent or the second agent outside of the secure communication channel. In some embodiments, the activity outside of the secure communication channel is authorized in real time.

In some embodiments, the activity outside of the secure communication channel is requested at a first time and the activity outside of the secure communication channel is authorized using the secure communication channel at a second time different than the first time.

In some embodiments, the step of storing a record of the authentication of the activity occurring outside of the secured communication channel on a memory in communication with one of the first agent and the second agent.

Some embodiments include a method for leveraging a secure communication channel between a first agent and a second agent to authenticate an activity outside of the secure communication channel. In some embodiments, the method includes receiving with the first agent a communication request through an insecure channel from the second agent, receiving with the first agent an indicator of a relative identity relationship from the second agent, sending with the first agent a request to authenticate the activity outside of the secure communication channel to the second agent, and authenticating the activity outside of the secure communication channel using the secure communication channel.

In some embodiments, the activity outside of the secure communication channel occurs on a browser. In some embodiments, the activity outside of the secure communication channel occurs on a telephone. In some embodiments, the activity outside of the secure communication channel is an in-person transaction. In some embodiments, the activity outside of the secure communication channel is authorized without sending an identity of either the first agent or the second agent outside of the secure communication channel. In some embodiments, the activity outside of the secure communication channel is authorized in real time. In some embodiments, the activity outside of the secure communication channel is requested at a first time and the activity outside of the secure communication channel is authorized using the secure communication channel at a second time different than the first time.

In some embodiments, the method includes the step of storing a record of the authentication of the activity occurring outside of the secured communication channel on a memory in communication with one of the first agent and the second agent.

In some embodiments, the secure communication channel is established by a first computing device generating a first absolute key for the first agent and generating a first partial relative key for the first agent. In some embodiments, the first absolute key and the first partial relative key define a relative identity of the first agent, wherein the relative identity is unique for a relationship between the first agent and the second agent. In some embodiments, the method includes generating an intermediate key by taking a mathematical function, hash, or algorithm of the first absolute key, the first partial relative key, and a second partial relative key for the second agent, and generating an encryption key by using a mathematical function, hash, or algorithm of the intermediate key and a second absolute key for the second agent. In some embodiments, the relative identity relationship is characterized by the encryption key, and the encryption key is used to encrypt subsequent communications between the first agent and second agent.

Some embodiments include computer-readable program product including program code, which when executed by a processor, causes an apparatus to establish a secure communication channel by a method including a first computing device generating a first absolute key for the first agent, and generating a first partial relative key for the first agent. In some embodiments, the first absolute key and the first partial relative key define a relative identity of the first agent, wherein the relative identity is unique for a relationship between the first agent and the second agent. In some embodiments, the method includes generating an intermediate key by taking a mathematical function, hash, or algorithm of the first absolute key, the first partial relative key, and a second partial relative key for the second agent. In some embodiments, the method includes generating an encryption key by using a mathematical function, hash, or algorithm of the intermediate key and a second absolute key for the second agent. In some embodiments, the relative identity relationship is characterized by the encryption key, and the encryption key is used to encrypt subsequent communications between the first agent and second agent. In some embodiments, the method further includes responsive to one of the first agent and the second agent receiving a request from the other of the first agent and the second agent to authenticate the activity outside of the secure communication channel, and authenticating the activity outside of the secure communication channel using the secure communication channel.

In some embodiments, the activity outside of the secure communication channel occurs on a browser. In some embodiments, the activity outside of the secure communication channel occurs on a telephone. Referring now to FIG. 1, there is shown a block diagram of a system 100 in which trusted two-way authenticated communication channels may be established and used. The system 100 includes three computing devices 110, 120, 130 connected to a network 150. Although the system 100 has been shown with three computing devices, a scalable solution is described herein that can comprise additional computing devices.

The computing devices 110, 120, 130 are representative of a class of computing devices which may be any device with a processing unit and memory that may execute instructions. Computing devices may be personal computers, server computers, computing tablets, set top boxes, video game systems, personal video recorders, telephones, personal digital assistants (PDAs), portable computers, laptop computers, fax machines, cell phones and special purpose devices. Computing devices have processor and memory. These computing devices may run an operating system, including, for example, variations of the Linux, Unix, MS-DOS, Microsoft Windows, Palm OS, and Apple Mac OS X operating systems.

The network 150 provides a platform for communications between the computing devices 110, 120, 130. The network 150 may be or include local-area networks (LANs), wide-area networks (WANs), metropolitan-area networks (MANs), distributed networks and other similar networks in which computing devices may be linked together. The network 150 may provide lower layer network support for computing devices to interact with one another. The network 150 may be packet-switched and may comprise a common or private bi-directional network, and may be, for example the Internet. The network 150 may be wired or wireless. In addition, the network 150 may be configured based on client-server architecture, a peer-to-peer architecture, or any other distributed computing system architecture. Further, the network 150 may be configured to comprise additional components so as to ensure a scalable solution.

The computing devices 110, 120, 130 may include respective agents 115, 125, 135. The agents 115, 125, 135 may be securely bound to their respective computing devices 110, 120, 130. Alternatively, the agents 115, 125, 135 may be portable and installable on different computing devices at a user's discretion. For example, an agent or critical components thereof may be stored on a device such as a smart card or portable flash memory device, and a user may carry the smart card or portable flash memory device for use with various computing devices.

The agents of FIG. 1 are a first agent 115, a second agent 125, and a third agent 135. Although respectively shown with a single agent 115, 125, 135, the computing devices 110, 120, and 130 may each have more than one agent. As explained below, the agents 115, 125, 135 may have identities relative one another. The agents 115, 125, 135 may authenticate communication channels between the communications devices, and may provide security for communications on the authenticated channels.

As used herein, an agent may be or include a software module or application which may be loaded and run on a computing device. An agent may communicate with other functional units within the corresponding computing device. An agent may also communicate with agent's remote to the communications device. One function of an agent is to store certain encrypted data so as to prevent the encrypted data from being accessible (e.g., viewed) by other functional units within the computing device (e.g., applications in user space). Access may be considered restricted if the agent has exclusive access or substantially exclusive access to the tools needed to decrypt the packets, such as decryption keys and software. Access may also be considered restricted if the agent has exclusive access or substantially exclusive access to the encrypted data itself.

Encrypted data is data which has been obscured to make it unreadable and unidentifiable at some level of confidence. Data which has been encrypted can be decrypted using a corresponding method or algorithm which may correspond to the method or algorithm used to encrypt the data. This data may be or may be representative of, for example, numbers, characters, audio, images, voice and video.

The relative identity of one agent to another agent may be based on information which is unique for the relationship between the two agents. The relative identity also may be based on information which is only known to the two agents in the particular relationship. With multiple computing devices 110, 120, 130 and multiple agents 115, 125, 135, there may be multiple separate relative identities in the system 100. Thus, the first user agent has an identity relative to the second user agent and a different identity relative to the third agent. Likewise, the second user agent has an identity relative to the first user agent and a different identity relative to the third agent. Finally, the third user agent has an identity relative to the first user agent and a different identity relative to the second agent. All six of these relative identities may be distinct. In short, a relative identity uniquely identifies one particular agent's relationship to another particular agent.

Even between two agents, there may be multiple unique relative identities arising from multiple relationships between the two agents. For example, an individual may have a checking account and a savings account with the same bank. Those two accounts will have a separate account numbers. Likewise, the multiple relative identities created for two particular agents could identify the separate relationships the two agents have with each other.

Additional and fewer units, modules or other arrangement of software, hardware and data structures may be used to achieve the processes and apparatuses described herein.

Figure 2:
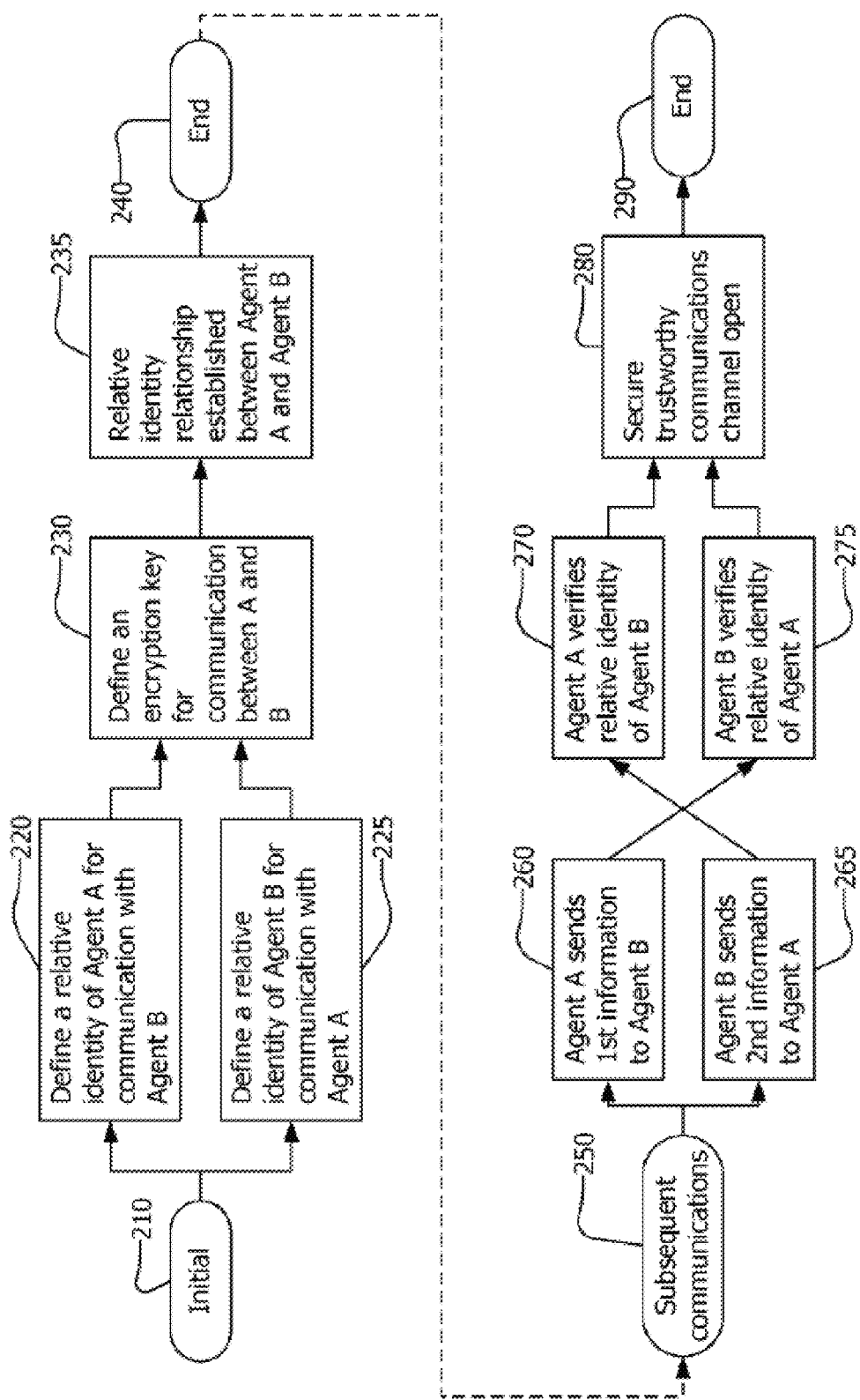
FIG. 2 is a flow chart of a process of establishing a secure trustworthy two-way communication channel between two agents according to some embodiments.

Referring now to FIG. 2, there is shown a flow chart of an exemplary process of establishing a communication channel between two computing devices. The description of the process is made with respect to a first agent, termed agent A, hosted by a first computing device and a second agent, termed agent B, hosted by a second computing device. These agents may be, for example, the agents 115, 125, 135 in the system 100 of FIG. 1.

The process for establishing a communication channel between agent A and agent B is compose of two parts. The first part, from 210 to 240, establishes a relative identity relationship between agent A and agent B. A relative identity relationship means that agent A has a relative identity with respect to agent B and agent B has a relative identity with respect to agent A. Both agent A and agent B are aware of the existence of the relative identity relationship, but neither knows the relative identity of the other. In the second part of the process, from 250 to 290, each agent verifies the identity of the other before opening a secure trustworthy communication channel between agent A and agent B.

Either agent A or agent B may initiate the process to establish a relative identity relationship at 210. At 220, agent A defines its relative identity with respect to agent B. The relative identity of agent A may be obtained from a third party (not shown in FIG. 2), may be derived from information about the relationship between agent A and agent B, or may simply be randomly selected by agent A. Similarly, at 225, agent B defines its relative identity with respect to agent A. The relative identity of agent B may be also obtained from a third party, may be derived from information about the relationship between agent A and agent B, or may simply be randomly selected by agent B. Agent A and agent B may not disclose their relative identities to each other.

Either agent A or agent B may initiate subsequent communication at 250. At 260, agent A may send first information to agent B. The first information may be derived from the relative identity of agent A in a manner that allows agent B to verify the identity of agent A without disclosing the relative identity of agent A. The first information may be derived from the relative identity of agent A and other data known to both agent A and agent B.

Similarly, at 265, agent B sends second information to agent A. The second information may be derived from the relative identity of agent B in a manner that allows agent A to verify the identity of agent B without disclosing the relative identity of agent B. The second information may be derived from the relative identity of agent B and other data known to both agent A and agent B.

The first and second information may be derived in numerous ways including using various algorithms well-known in the art of cryptography. For example, the first and second information can be generated by using one-way hash functions, modulus functions, cyclic arithmetic operations, and various other algorithms.

It should be recognized that the first and second information of this example may be distinct from each other. Additionally, both the first and second information are derived, in part, from the relative identities of agents A and B and are thus unique to the relationship between these two agents. While both the first and second information are derived, in part, from the relative identities of the agents A and B, respectively, the relative identities cannot be determined from the first and second information.

At 270, agent A uses the second information received from agent B to verify the identity of agent B. Similarly, at 275, agent B uses the first information received from agent A to verify the identity of agent A. A secure trustworthy communications channel is opened between agents A and B at 280 only if both agent A and B successfully verify the identity of the other agent. The process from 250 to 290 may be repeated for every communication session between agent A and agent B, or may be repeated only if secure trustworthy communications are desired between agents A and B.

Communications between agents A and B, including communications required to verify their relative identities, may be encrypted using an encryption key. The encryption key may optionally be a unique key which may be defined at 230.

The communication channel that is established at 280 may be described as a secure communication channel because the identity information of either agent cannot be stolen. The identity information of an agent cannot be stolen because the identity information is not transmitted, provided or released from the agent over the network. As such, the identity of the agent is protected and is not compromised. As a result, fraudulent transactions based on using an agent's identity information are prevented since an agent's identity information cannot be obtained by an unauthorized entity.

The communication channel that is established at 280 may also be trustworthy. A trustworthy communication channel is a channel which is established between authorized entities. The communication channel of 280 is trustworthy since each agent has verified the identity of the other agent. The trust that is established and verified between the agents is based on the first and second information exchanged between the agents who, in turn, are derived from the relative identity of each agent.

Figure 3:
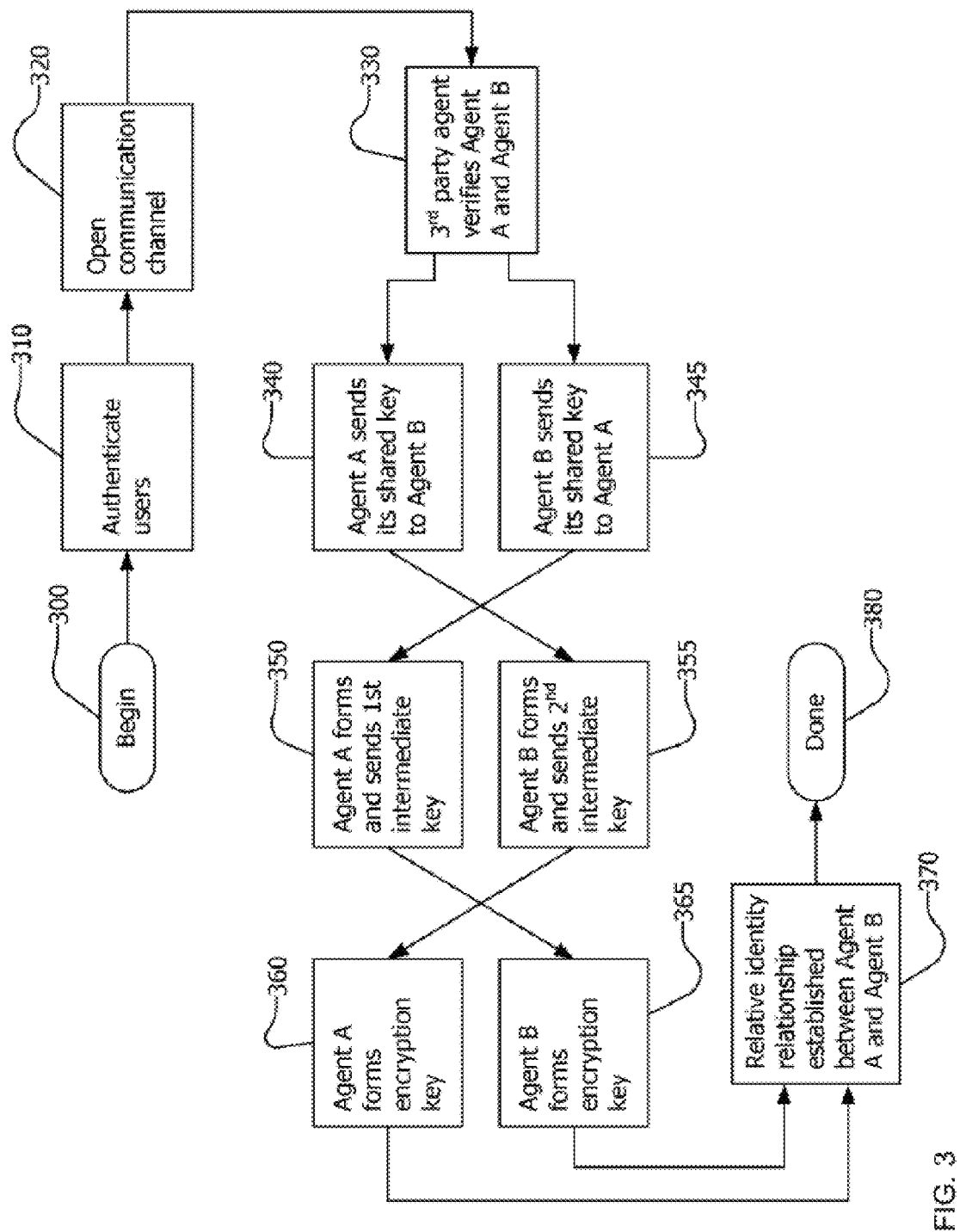
FIG. 3 is a flow chart of a process of establishing a relative identity relationship between two agents according to some embodiments.

FIG. 3 is a block diagram of another embodiment of a process to establish a relative identity relationship between two agents. The agents are again referred to as agent A and agent B. The process starts at 300 and ends at 380.

At 310, the agent A and agent B may be first authenticated to their respective computing devices. The agents may be authenticated to their respective computing devices in a number of ways, which may be the same or different for agent A and agent B. For example, when the local agent is under a user's control, the local agent may be authenticated using absolute identity information of the user. This could be, for example, a login ID and a password, and/or biometrics.

An agent may be authenticated to the computing device through relative identity. One technique for authenticating a user-controlled agent is to provide the computing device with an embedded master agent whose sole role is to interact with other agents installed in the computing device. Thus, for example, a user-controlled agent may authenticate itself to the embedded master agent based upon a relative identity between the user-controlled agent and the embedded master agent.

Either agent A or agent B may open a communication channel to the other agent at 320. At 330, a third party agent may optionally verify the identity of agent A and agent B and provide assurances to each agent of the identity of the other. The third party agent may be a specialized agent dedicated to verifying the identities of other agents on the network, or may be any agent that has established relative identity relationships with both agent A and agent B. The supervision of the third party agent is optional, and agent A and agent B may proceed to establish a relative identity relationship without third-party participation.

The process of FIG. 3 requires each agent to know or possess an absolute key and a partial relative key. Each agent's absolute key and the partial relative key may be obtained from an outside source (e.g., assigned to the agent) or may be generated within the agent. Keys may be generated using numerous techniques and algorithms. Agent A may acquire or generate a unique absolute key for each relationship between itself and other agents, including agent B. Agent A may have a single partial relative key used for all relationships, or may acquire or generate a unique partial relative key for each relationship with other agents. Similarly, agent B may have a unique absolute key for each relationship, and either a single partial relative key used for all relationships or a unique partial relative key for each relationship.

An agent's absolute key may not be transmitted or revealed to any other agent on the network. Not transmitting or revealing an agent's absolute key ensures that an agent's identity information cannot be stolen from transmission through the network since the identity information is not transmitted or revealed on the network. Since an agent has a unique absolute key for each relationship and the absolute keys are never transmitted or disclosed to other agents, each absolute key along with the partial relative key is equivalent to the relative identity of the agent for a specific relationship.

At 340 and 345, agents A and B exchange their respective partial relative keys. At 350, agent A forms a first intermediate key derived from agent A's absolute key and a function of the partial relative keys of both agent A and agent B. As previously described, the first intermediate key may be derived in numerous ways including using any of various algorithms or functions such as one-way hash functions, modulus functions, cyclic arithmetic operations, and various other algorithms. Similarly, at step 355, agent B forms a second intermediate key derived from its absolute key and a function of the partial relative keys of both agents. The first and second intermediate keys can be defined as follows:

$$Kn = f(a, q(c,d)) = \text{first immediate key, and}$$

$$K12 = f(b, q(c,d)) = \text{second immediate key}$$

where:
a=absolute key of agent A;
b=absolute key of agent B
c=partial relative key of agent A;
d=partial relative key of agent B;
f and q are suitable functions or algorithms.

It should be recognized that the first and second intermediate keys of this example are distinct from each other. Additionally, both the first and second intermediate keys are derived, in part, from the partial relative keys of the local and remote agents and are thus unique to the relationship between these two agents. While both the first and second intermediate keys are derived, in part, from the absolute key of the agent that calculated the intermediate key, the absolute keys cannot be determined from the intermediate keys.

At step 360, agent A may form an encryption key KAB by combining agent A's absolute key with the second intermediate key received from agent B. The combination of agent A's absolute key with the second intermediate key may be done using the same function or algorithm used to form the intermediate keys. Similarly, at step 365, agent B may form an encryption key KBA by combining agent B's absolute key with the first intermediate key received from agent A. The combination of agent B's absolute key with the first intermediate key may be done using the same function or algorithm used to form the intermediate keys.

The function used to form the intermediate keys and the encryption keys may be an associative function, in which case the following relationship will hold:

$$KAB=f[a,f(b,q(c,d))]=f[b,f(a,q(c,d))]=KBA.$$

Thus both agent A and agent B may be in possession of an encryption key that may be used to encrypt subsequent communications between the agents. Moreover, since the encryption key can only be created through the use of the secret keys of both agents, the key cannot be recreated by either agent alone, or by any other party, even if the other party intercepts the partial relative keys and the intermediate keys during transmission between agent A and agent B. After the encryption key is formed, agents A and B may each discard the partial relative key and the intermediate key received from the other agent.

Figure 4:
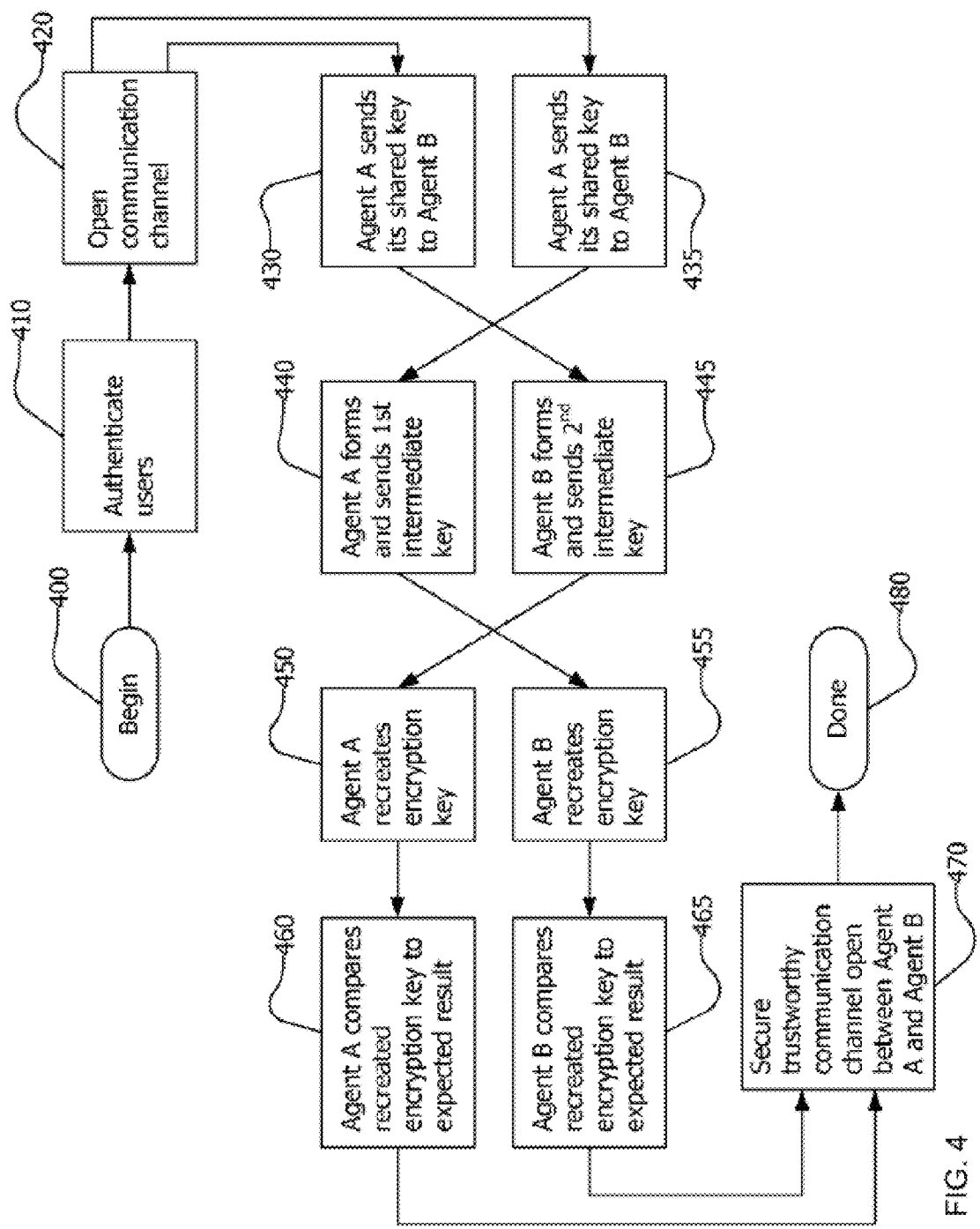
FIG. 4 is a flow chart of a process of establishing a secure trustworthy two-way communication channel between two agents having a relative identity relationship according to some embodiments.

Agent A and agent B may then use the encryption key and their respective absolute and partial relative keys to authenticate one another at the start of subsequent communications. As shown in FIG. 4, an embodiment of a process for opening a secure trustworthy communication channel between agent A and agent B involves recreating the encryption key using information received from the other agent. The process for establishing a secure trustworthy communication channel starts at 400 and ends at 480. Optionally, the agents and users may be authenticated at 410 using the methods previously described in conjunction with step 310 in FIG. 3.

Either agent A or agent B may open a communication channel at 420. At 430 and 435, agent A and agent B exchange their respective partial relative keys. At 440 and 445, agent A forms and sends the first intermediate key, and agent B forms and sends the second intermediate key. The function or algorithm used to form the first and second intermediate keys may be the same as those employed when establishing the relative identity relationship between agent A and agent B (at 350 and 355 of FIG. 3). At 450 and 455, agent A and agent B recreate the encryption key. Recreating the encryption key may be performed using the function or process previously used when establishing the relative identity relationship between agent A and agent B (at 360 and 365 of FIG. 3).

At 460, agent A may compare the recreated encryption key from 450 with the known value of the encryption key. An exact match between the recreated and known encryption keys validates the identity of agent B to agent A. Similarly agent B may validate the identity of agent A at 465. A secure trustworthy communication channel may be opened between agent A and agent B at 470 only if both agents have successfully validated the identity of the other agent.

It must be noted that an impostor (e.g. Phisher) attempting to act as agent B must possess agent B's absolute and partial relative keys, as well as have knowledge of the functions or algorithms used to form the intermediate key and encryption key. In the optional situation where the communications between agent A and agent B are encrypted using the encryption key, the imposter would have to know the encryption key as well. Since the encryption key and the absolute key are never disclosed outside of the agent or transmitted over the network, the use of relative identity provides substantial protection against phishers and other impostors.

Figure 5:
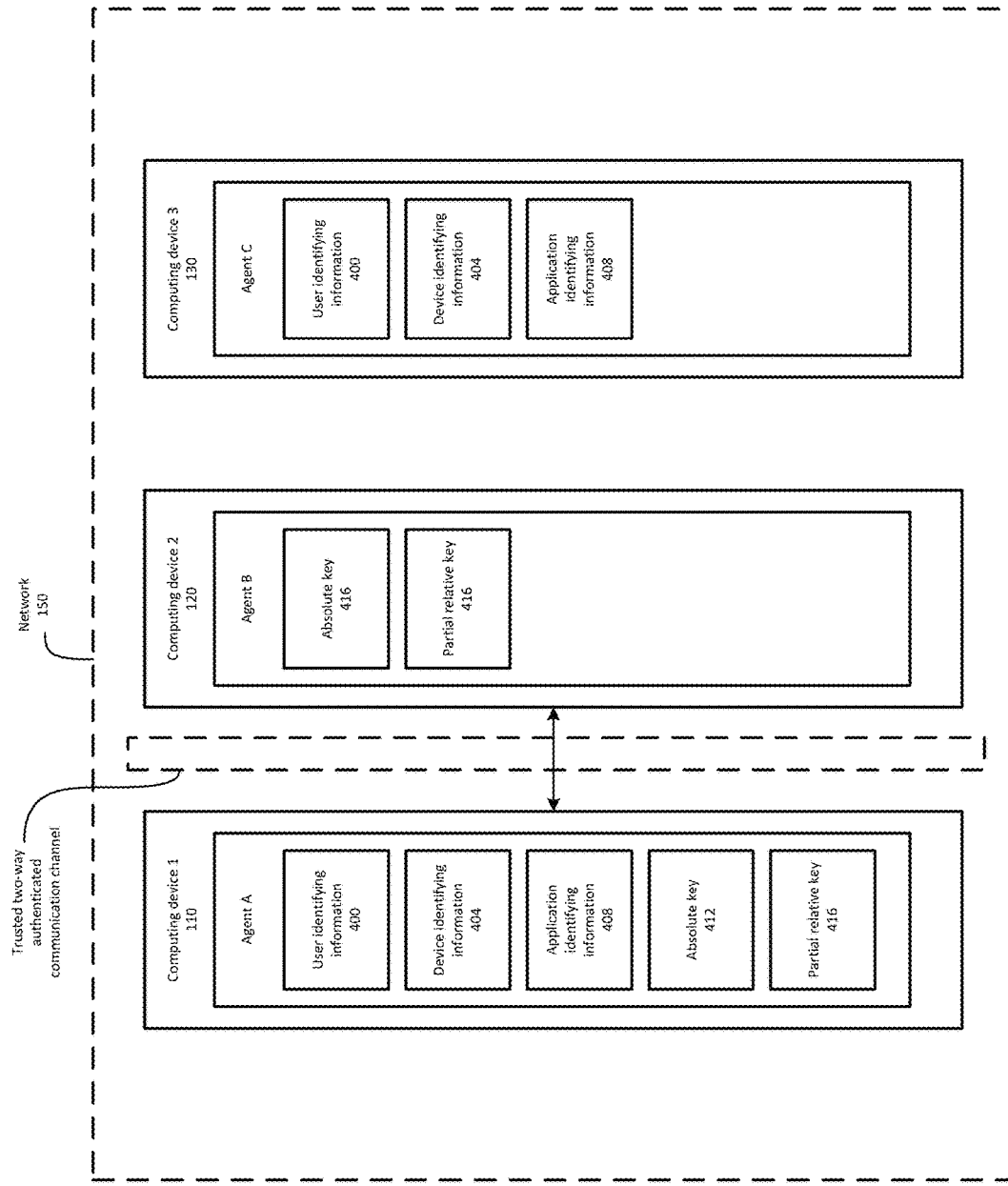
FIG. 5 is a block diagram of a system in which secure trustworthy two-way communication channels may be established and used according to some embodiments.

In the example illustrated in FIG. 5, either agent A or agent B is associated with a specific user having user identifying information 400, a specific computing device having device identifying information 404, and a specific software application having application identifying information 408. The term "user identifying information" is generally used to refer to personal identifying information associated with the user. Exemplary user identification may include a name, an address, a birthdate, a social security number, a user name, a password, or factual data about the user's life or family history. The term "device identifying information" is generally used to refer to identifying information associated with a specific computing device. Exemplary device identification information may include a serial number of the device, a type of the device (e.g. mobile phone, tablet, laptop computer), or an IP address of the computing device. The term "application identifying information" is generally used to refer to identifying information associated with a specific instance of the instance of the software application. Exemplary application identifying information may include a serial number of the software application, a version of the software application, and a type of device on which the application is programmed to run (e.g. a specific brand of computing device or a specific operating system of the computing device). Either agent A, agent B, or both agent A and agent B are associated with specific user identifying information 400, device identifying information, 404 or application identification information 408.

For example, in the embodiment illustrated in FIG. 5, agent A is associated with the user identifying information 400, the device identifying information 404, and the software application identifying information 408. A relative identity is then formed between agent A and agent B according to the method described in FIGS. 2 and 4. In either method, a portion of the user identifying information 400, a portion of the device identifying information 404, and a portion of the application identifying information is shared with agent B in the process of forming the relative identity, and a portion of the user identifying information 400, a portion of the device identifying information 404, and a portion of the application identifying information is not shared with agent B. For example, for processes requiring agent A to know or possess the absolute key 412 and the partial relative key 416 and requiring agent B to know or possesses the absolute key 420 and the partial relative key 424, the absolute key 412, the partial relative key 416, and the partial relative key 424 may all include the portion of the user identifying information, the portion of the device identifying information, and the portion of the application identifying information. Accordingly, after the relative identity relationship has been established between agent A and agent B, in order to establish the trusted two-way authenticated communication channel between agent A and agent B, the user, the computing device, and the instance of the software application attempting to open the trusted two-way authenticated communication channel between agent A and agent B must be the same as the user, the computing device, and the instance of the application used to establish the relative identity relationship between agent A and agent B.

Since the relative identity established by agent A and agent B is specific to the user, the computing device, and the instance of the software application used to establish the relative identity relationship, the encryption key created in terms of the relative identity relationship is unique to the specific relationship between agent A and agent B. Accordingly, agent A and agent B have a 1:1 authentication relationship. When agent A or agent B opens the trusted two-way authenticated communication channel, agent A or agent B refers to the relative identity relationship, for example by using a relationship identifier that is distinct from the encryption key. Agent A and agent B then recreate the encryption key using the relative identity relationship. Since the relative identity is specific to the software application used to initiate the relative identity relationship, after the initial configuration of the relative identity relationship, the trusted two-way authenticated communication channel may not be opened by a generic interaction between agent A and agent B, agent A and a third party, or agent B and the third party.

Either agent A or agent B may specify an amount of user identifying information 400, device identifying information 404, or software application identifying information 408 that must be used to establish the relative identity relationship. Relative identity relationships made using a relatively large amount of user identifying information 400, device identifying information 404, or software application identifying information 408 are more secure than relative identity relationships made using a relatively small amount of user identifying information 400, device identifying information 404, or software application identifying information 408.

Figure 6:
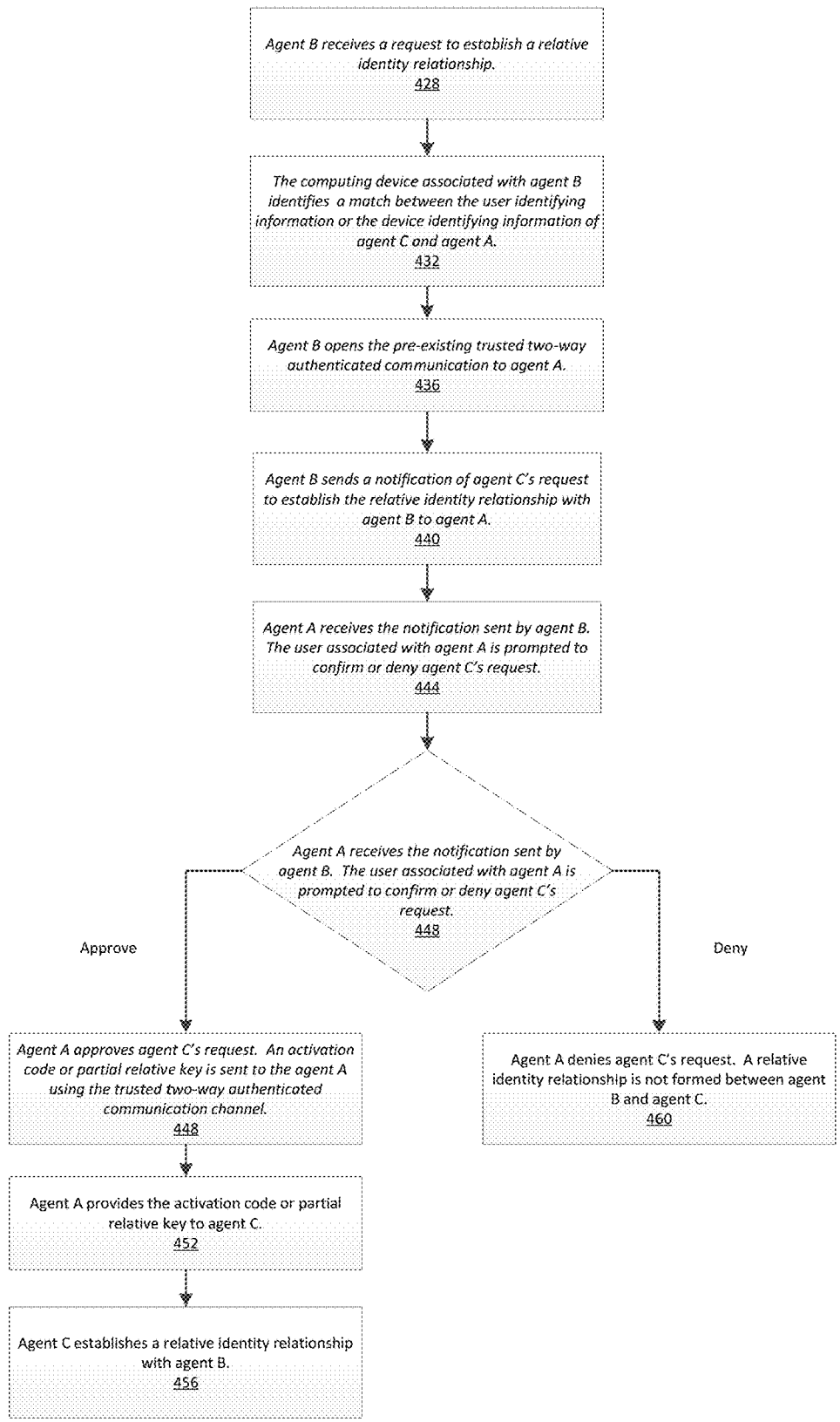
FIG. 6 is a method of leveraging an existing secure trustworthy two-way communication channel to establish a second secure trustworthy two-way communication channel according to some embodiments.

In some embodiments, the relative identity relationship established between agent A and agent B as described above with respect to FIG. 5 may be used to authenticate an attempt by a third agent, agent C, to establish a relative identity with agent B or with agent A. In the embodiment of FIG. 6, agent A and agent C are associated with at least one of the same user or the same device. In such a method, agent B receives a request to establish the relative identity relationship from Agent C that includes the user identifying information 400, the device identifying information 408, and the application identifying information 412 corresponding to agent C (block 428). After receiving the request from agent C, the computing device associated with agent B identifies a match between at least one of the user identity information and the device identity information of agent A (block 432). Agent B then opens the trusted two-way authenticated communication channel using the previously-established relative identity relationship between agent A and agent B (block 436). After opening the trusted two-way authenticated communication channel, agent B sends a notification of agent C's request to establish the relative identity relationship to agent A and prompts agent A to confirm or deny agent C's request to establish the relative identity relationship (block 440). The notification sent by agent B to agent A over the trusted two-way authenticated communication channel includes the user identifying information 400, the device identifying information 404, and the application identifying information 408 sent with agent C's request. After receiving the notification sent by agent B, a user controlling agent A may confirm or deny agent C's request (block 444). If agent A approves agent C's request, agent B sends agent A a notification that includes information for use in establishing the relative identity between agent B and agent C, such as an activation code or the partial relative key 424, to agent A using the trusted two-way authenticated communication channel (block 448). Agent A then provides the information for use in establishing the relative identity between agent B and agent C to agent C (block 452). Agent B and agent C then establish the relative identity relationship using the process described above in FIGS. 2 and 4 (block 456). If agent A denies agent C's request, the relative identity relationship is not formed between agent A and agent B (block 460). Accordingly, the trusted two-way authenticated communication channel between agent B and agent C may be authenticated without the use of a third-party authentication service or a third-party verification or certification service.

In some embodiments, the relative identity relationship established between agent A and agent B or agent C and agent B may be used to authenticate an attempt by a fourth agent, agent D, to establish a relative identity with agent B. As described above with respect to the authentication of agent C's attempt to establish a relative identity relationship with agent B, the previously-established relative identity relationship between agent A and agent B or agent C and agent B may be opened in response to a request from agent D to form a relative identity relationship with agent B. Accordingly, the trusted two-way authenticated communication channel between agent B and agent C may be authenticated without the use of a third-party authentication service or a third-party verification or certification service.

In some constructions, any of the instances of the software application may be operable to manage the relative identity relationships. For example, if a user is associated with several agents, for example agents A, C, and D that have relative identity relationships with another agent, such as agent B, the instance of the software application associated with one of agent A, agent C, or agent D may be used to remove relative identity relationships between agent B and the others of agent A, agent C, or agent D. In some constructions, the most recently established of the agents associated with a user such as, for example, agents A, C, or D associated with a user cannot be used to remove the agent that was used to confirm the most recently established agent's request to form a relative identity relationship with another agent, such as agent B.

In an exemplary embodiment involving the system of FIG. 5 and the method of FIG. 6, agent A may be a customer and agent B may be a bank. The customer downloads a first copy of the software application provided by the bank onto a first computing device having first device identity information. Each instance (e.g. copy) of the software application includes unique application identity information. When the customer opens the first copy of the software application for a first time, the first copy of the software application prompts the customer to enter the personal identifying information or the absolute identity information of the user. The customer then uses the first copy of the software application to request to establish the relative identity relationship with the bank. A portion of the user identifying information 400, the device identifying information 404, and the application identifying information 408 of the customer is sent to the bank. The bank sends information to the customer for use in establishing the relative identity relationship with the customer as described above with respect to FIGS. 2 and 4. For example, the customer's account number for a specific account in the bank may be used to generate the relative identity relationship. After the relative identity relationship between the customer and the bank is formed, the customer and the bank may use the software application to communicate using the trusted two-way authenticated communication channel. In some constructions, the user identifying information or the absolute identity information used to establish the relative identity between the customer and the bank is stored in a memory of the computing device associated with the customer and accessed by the first copy of the software application when the customer opens the secure communication channel. In other constructions, the user identifying information or absolute identity information used to establish the relative identity relationship between the customer and the bank is not stored on the first copy of the software application and must be entered the customer each time the trusted two-way communication channel is opened.

Since the relative identity relationship established between the customer and the bank is created using a portion of the user identifying information 400, a portion of the device identifying information 404, and a portion of the application identifying information 408, the trusted two-way authenticated communication channel can only be open if the user, the device, and the copy of the application used to initiate the attempt to open the trusted two-way authenticated communication channel are all the same as the user, the device, and the copy of the application are the same as were used to establish the relative identity relationship between the customer and the bank. For example, if the customer deletes the first copy of the software application from the first computing device and installs a second copy of the software application onto the first computing device, the customer cannot use the second copy of the software application to access the trusted two-way authenticated communication channel established using the first copy of the software application. Instead, the customer will be prompted to establish a new relative identity relationship with the bank when the user tries to use the second copy of the software application to open the trusted two-way authenticated communication channel. Similarly, a person other than the customer who established the trusted two-way authenticated communication channel attempts to the customer cannot use the first copy of the software application to access the trusted two-way authenticated communication channel established by the customer. Instead, the person other than the customer will be prompted to establish a new relative identity relationship with the bank when the person other than the customer tries to use open the trusted two-way authenticated communication channel.

Continuing with the present example, the customer may download a third copy of the software application onto a second computing device. When the customer opens the third copy of the software application for a first time, the third copy of the software application prompts the customer to enter personal identifying information or absolute identify information to the third copy of the software application. The customer then uses the third copy of the software application to request to establish a relative identity relationship with the bank. A portion of the user identifying information 400, a portion of the device identifying information 404, and a portion of the application identifying information 408 of the customer is sent to the bank and the bank sends information to the customer for use in establishing the relative identity relationship with the customer as described above with respect to FIGS. 2 and 4. Since the customer has a pre-existing relative identity relationship with the bank using the first copy of the software application and the first computing device, a portion of the user identifying information 400 sent in the third software application's request to establish a relative identity relationship will match a portion of the user identifying information 400 associated with the customer's existing relative identity relationship with the bank. After identifying the match between the request sent by the third copy of the software app and the customer, the bank opens the trusted communication channel between the customer, the first device, and the first copy of the software application (e.g. a pre-existing trusted two-way authenticated communication channel) and sends a notification of the third copy of the application's request to the customer over the pre-existing trusted two-way authenticated communication channel. The notification includes at least a portion of the user identifying information 400, a portion of the device identifying information 404, and a portion of the application identifying information 408 that the third copy of the software application included in the request to the bank. After receiving the notification sent over the pre-existing trusted two-way authenticated communication channel, the customer may approve or deny the request sent by the third copy of the software application. Since in this example, the request is a genuine request made by the customer, the customer approves the request included in the notification using the pre-existing trusted two-way communication channel. After receiving the customer's approval of the request, the bank sends the activation code or the partial key to the customer using the pre-existing trusted two-way communication channel. After receiving the activation code or the partial key from the bank, the customer may enter the activation code or the partial key into the third copy of the software application. After the customer has approved the request, the third copy of the software application and the bank establishes the relative identity relationship. When the request is not a genuine request made by the customer, the customer may deny the request included using the pre-existing trusted two-way communication channel, and a relative identity relationship is not established. In some constructions, the user identifying information 400, the device identifying information 404, and the application identifying information 408 may be retained by the bank.

Figure 7:
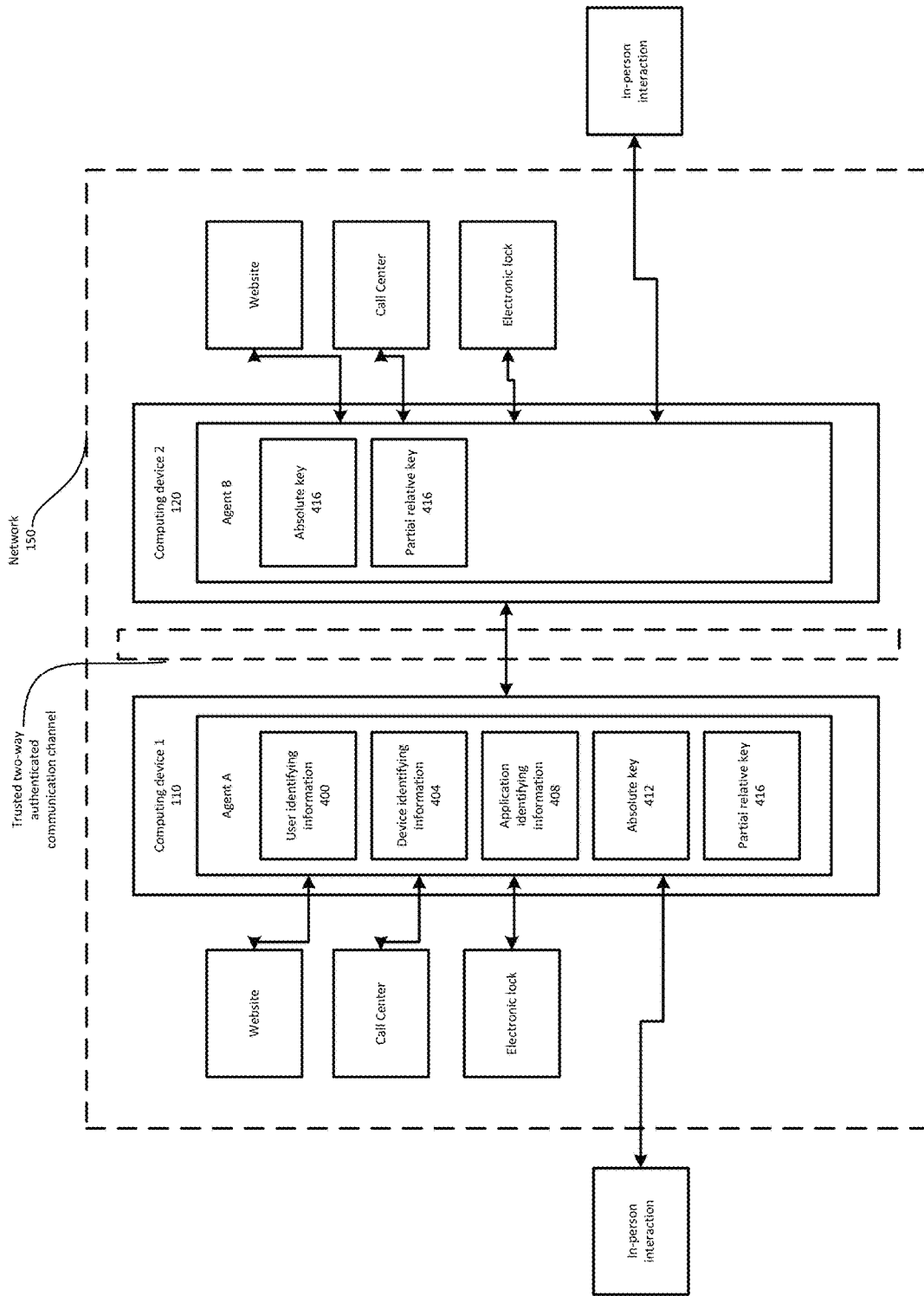
FIG. 7 is a block diagram of a system in which an existing secure trustworthy two-way communication channel may be used to authenticate interactions made over an unsecured connection according to some embodiments.

In some embodiments, the pre-existing trusted two-way authenticated communication channel may be leveraged to authenticate requests made between agent A and agent B over an unsecured connection. Exemplary unsecured connections may include a web browser, a telephone to a call center, or an in-person interaction (e.g. between a customer and an employee of a service provider). As shown in FIG. 7, agent A and agent B may have the relative identity relationship that allows agent A and agent B to communicate using the trusted two-way authenticated communication channel. Agent A and agent B may also communicate using the unsecured connection. When agent A and agent B communicate using the unsecured connection, either agent A or agent B may use the pre-existing trusted two-way authenticated communication channel to request confirmation of instructions or a request made by agent A or agent B using the unsecured communication channel prior to following the instructions or responding to the request. In this manner, the pre-existing authenticated trusted two-way communication channel may be leveraged to validate the relative identity relationship between agent A and agent B without relying on third-party validation services or requiring personal identifying information or absolute identity information to be shared over the unsecured connection.

Figure 8:
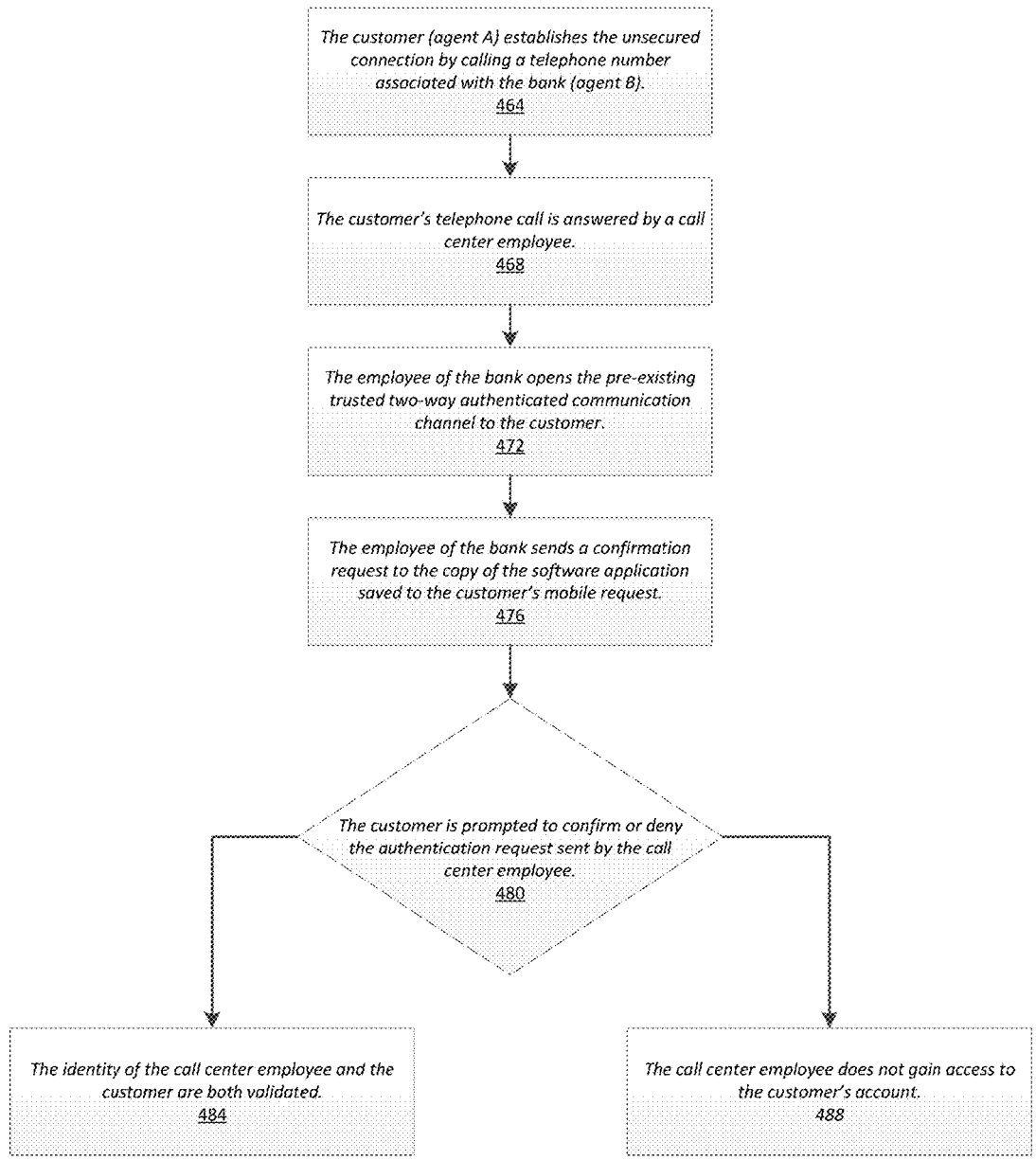
FIG. 8 is a method of leveraging an existing secure trustworthy two-way communication channel to authenticate interactions made over an unsecured connection according to some embodiments.

FIG. 8 illustrates a flowchart of an exemplary embodiment in which agent A may be a customer and agent B may be a bank. The customer has downloaded the software application provided by the bank onto the computing device. The customer has used the software application to establish the relative identity relationship with the bank. The relative identity has been established using a portion of the customer's user identifying information 400, a portion of the device identifying information 404, and a portion of the application identifying information 408 and the partial relative key 424 associated with the bank. Since the customer and the bank have established the relative identity relationship, the customer and the bank may use the software application to communicate using the trusted two-way authenticated communication channel.

In addition to communicating using the trusted two-way authenticated communication channel, the customer and the bank may communicate over an unsecured communication channel. For example, in the embodiment of FIG. 8, the unsecured communication channel is a phone call to a call center associated with the bank. As shown in FIG. 8, the customer establishes the unsecured connection by calling a telephone number associated with the bank (block 464). The customer's telephone call is answered by a call center employee (block 468). At the time that the customer's telephone call is answered, the customer has no verification that the person that answered the telephone call is an employee of the bank and the employee of the bank has no verification that the caller is actually the customer. Accordingly, after answering the telephone call, the employee of the bank may open the trusted two-way authenticated communication channel to for mutual verification between the customer and the bank (block 472). For example, the employee of the bank may send a confirmation request to the copy of the software application saved to the customer's mobile device requesting the customer authenticate that the call is genuine (block 476). The customer is prompted to accept or deny the authentication request (block 480). If the customer accepts the authentication request, the identity of both the customer and the bank are validated without the exchange of personal identifying information between the customer and the employee at the call center (block 484). If the customer denies the confirmation request, the call center employee is denied access to the customer's account information (block 488). In some embodiments, the notification sent to the customer is customizable. For example, in some embodiments, the employee of the bank introduces him or herself on the phone before sending the request. The notification sent to the customer would then include a name of the employee at the call center, so that the customer could have confirmation through the trusted two-way authenticated communication channel that the person on the phone call is actually an employee of the bank. For example, the notification may indicate the name and the location of the employee of the bank that was previously communicated to the customer during the phone call.

In some embodiments, the trusted two-way authenticated communication channel may be used to approve specific transaction made by the customer using the customer's account at the bank. For example, whenever a transaction using a credit card or a debit card is made by the customer, the bank may open the trusted two-way authenticated communication channel with the customer and send the customer a notification of the transaction. The notification requires the customer to approve or deny the transaction before the bank releases the funds for the transaction. In some embodiments, the customer may customize the transactions that require approval. For example, the customer may only require approval for transactions exceeding a predetermined amount of money. In some embodiments, the bank may customize the transactions that require verified approval. For example, the bank may require authenticated verification for any requests to transfer funds, add a new person to an account, change an address associated with the account, or change a beneficiary of the account. In such an embodiment, after receiving a request to transfer funds from the customer, the bank sends a notification to the copy of the software application saved on the customer's device using the trusted two-way authenticated communication channel. In some embodiments, the bank may customize the text of the notification for each transaction. For example, the confirmation request may include an account number from which the money will be withdrawn, an account number to which the money will be transferred, and an amount of money that will be transferred. In such an embodiment, the bank may save the customer's approval of the request to have an auditable trail of the transaction. Since the notification is sent to the customer before the transaction occurs, the customer has an additional opportunity to confirm that transaction request is correct. If the transaction request is incorrect, the customer may deny the confirmation request included in the notification before the money is transferred incorrectly. Furthermore, if the transaction included in the confirmation request is fraudulent, the customer may deny the transaction request before the money has been transferred to the thief.

In other embodiments, the trusted two-way authenticated communication channel may be used to confirm requests made between agent A and agent B using other types of unsecured communication channels. For example, in some embodiments, the unsecured communication channel may be a web browser, agent A may be a customer, and agent B may be a service provider that has a website accessible by a browser. In such an embodiment, agent A and agent B have established the relative identification as described above. Accordingly, before the user makes a transaction request from the service provider, the customer may leverage the trusted two-way authentication channel to confirm that the webpage is genuinely associated with the service provider before making a transaction. The customer or the service provider may also leverage the trusted two-way authenticated communication channel to confirm or deny service requests or transaction requests made using the browser without relying on third-party verification services.

In other embodiments, the unsecured communication channel may be an in-person interaction. In such an embodiment, agent A is a customer, and agent B is a service provider. The customer interacts in-person with the service provider through an employee of the service provider. In such an embodiment, the customer and the service provider have established a relative identity relationship as described above. Accordingly, when beginning an in-person interaction between the customer or the employee, the customer may leverage the trusted two-way authenticated communication channel to require the employee to confirm a relationship to the service provider. The employee may leverage the trusted two-way authenticated communication channel to confirm that the customer does have a relationship with the service provider without requiring the customer to provide any personal identifying information in a public setting.

In other embodiments, the unsecured communication channel may be a physical lock, such as a lockbox or a locked door. In such an embodiment, agent A is a user, and agent B the owner of the lock. In such an embodiment, agent A and agent B have established the relative identification as described above. Accordingly, when agent A requests access to the locked box or the locked door, agent A may leverage the existing two-way authenticated communication channel to send an access request to agent B to unlock the door. After agent B has approved the access request sent by agent A, the door may unlock. Agent B may also deny permission for agent A to unlock the door. In some constructions, the access request sent by agent A may be customized by agent B. For example, the access request sent by agent A may include an identity of the requester, a time and a data of the access request, and a location of the access request. Agent B may store the access requests from agent A and confirmation responses sent from agent B to agent A to have an auditable trail of agents that have requested access and agents that have been granted access.

Various features and advantages of the disclosure are set forth in the following claims.

What is claimed is:

1. A method implemented by an electronic device for leveraging a secure communication channel between a first agent of the electronic device and a second agent of another electronic device to authenticate an activity occurring on another communication channel that is outside of the secure communication channel, the method comprising:
generating, by the electronic device, a first absolute key and a first partial relative key, wherein the first absolute key and the first partial relative key define a relative identity of the first agent that is unique to a relationship between the first agent and the second agent;
receiving, by the electronic device, a message from the other electronic device indicating that the other communication channel is established and that the activity is about to occur, wherein the message includes a second partial relative key that defines a relative identity of the second agent that is unique to the relationship between the first agent and the second agent;
generating, by the electronic device, a first intermediate key based on the first absolute key, the first partial relative key, and the second partial relative key;
transmitting, by the electronic device, the first intermediate key to the other electronic device;
generating, by the electronic device, a first encryption key based on the first absolute key and a second intermediate key received from the other electronic device after generating the first intermediate key;
opening, by the electronic device, the secure communication channel based on a validation of the first encryption key and a validation of a second encryption key that is generated by the other electronic device, wherein the second encryption key is based on a second absolute key generated by the other electronic device and the first intermediate key, and wherein the second absolute key defines the relative identity of the second agent that is unique to the relationship between the first agent and the second agent;
receiving, by the electronic device, an authentication request from the other electronic device using the secure communication channel to authenticate the activity, wherein the authentication request includes an indication of at least one activity type of the activity;
displaying, by the electronic device, an authentication request display that is based on the indication of the at least one activity type of the activity; and
after displaying the authentication request display, transmitting, by the electronic device, an authentication reply to the other electronic device using the secure communication channel for authentication and execution of the activity occurring on the other communication channel that is outside of the secure communication channel.

2. The method of claim 1, wherein the other communication channel includes a communication channel for electronic communication using a browser.

3. The method of claim 1, wherein the other communication channel includes a communication channel for telephonic communication using a telephone.

4. The method of claim 1, wherein the other communication channel includes a communication channel for in-person communication.

5. The method of claim 1, wherein the authentication reply is for authenticating the activity without sending an identity of either the first agent or the second agent outside of the secure communication channel.

6. The method of claim 1, wherein the authentication reply is for authenticating the activity in real time.

7. The method of claim 1, wherein the message from the other electronic device indicating that the other communication channel is established and that the activity is about to occur on the other communication channel that is outside of the secure communication channel is received, by the electronic device, at a first time and the authentication reply is transmitted, by the electronic device, to the other electronic device using the secure communication channel at a second time that is different from the first time.

8. The method of claim 1, further comprising storing, by the electronic device, a record of the authentication reply in a memory that is in communication with at least one of the electronic device or the other electronic device.

9. An electronic device for leveraging a secure communication channel between a first agent of the electronic device and a second agent of another electronic device to authenticate an activity occurring on another communication channel that is outside of the secure communication channel, the electronic device comprising:
a memory; and
at least one processor configured to:
generate a first absolute key and a first partial relative key, wherein the first absolute key and the first partial relative key define a relative identity of the first agent that is unique to a relationship between the first agent and the second agent,
receive a message from the other electronic device indicating that the other communication channel is established and that the activity is about to occur, wherein the message includes a second partial relative key that defines a relative identity of the second agent that is unique to the relationship between the first agent and the second agent,
generate a first intermediate key based on the first absolute key, the first partial relative key, and the second partial relative key,
transmit the first intermediate key to the other electronic device,
generate a first encryption key based on the first absolute key and a second intermediate key received from the other electronic device after generating the first intermediate key,
open the secure communication channel based on a validation of the first encryption key and a validation of a second encryption key that is generated by the other electronic device, wherein the second encryption key is based on a second absolute key generated by the other electronic device and the first intermediate key, and wherein the second absolute key defines the relative identity of the second agent that is unique to the relationship between the first agent and the second agent, receive an authentication request from the other electronic device using the secure communication channel to authenticate the activity, wherein the authentication request includes an indication of at least one activity type of the activity, display an authentication request display that is based on the indication of the at least one activity type of the activity, and after displaying the authentication request display, transmit an authentication reply to the other electronic device using the secure communication channel for authentication and execution of the activity occurring on the other communication channel that is outside of the secure communication channel.

10. The electronic device of claim 9, wherein the other communication channel includes a communication channel for electronic communication using a browser.

11. The electronic device of claim 9, wherein the other communication channel includes a communication channel for telephonic communication using a telephone.

12. The electronic device of claim 9, wherein the other communication channel includes a communication channel for in-person communication.

13. The electronic device of claim 9, wherein the authentication reply enables the at least one processor to authenticate the activity without sending an identity of either the first agent or the second agent outside of the secure communication channel.

14. The electronic device of claim 9, wherein the at least one processor is configured to authenticate the activity occurring on the other communication channel that is outside of the secure communication channel in real time.

15. The electronic device of claim 9, wherein the at least one processor is configured to:

receive the message from the other electronic device indicating that the other communication channel is established and that the activity is about to occur on the other communication channel that is outside of the secure communication channel at a first time; and transmit the authentication reply to the other electronic device using the secure communication channel at a second time that is different from the first time.

16. The electronic device of claim 9, wherein the at least one processor is further configured to store a record of the authentication reply in a memory that is in communication with at least one of the electronic device or the other electronic device.

17. The electronic device of claim 9, wherein the at least one processor is configured to:

execute a mathematical function, hash, or algorithm of the first absolute key, the first partial relative key, and the second partial relative key to generate the first intermediate key; and execute a mathematical function, hash, or algorithm of the first absolute key and the second intermediate key to generate the first encryption key.

18. A non-transitory, computer-readable storage medium for implementation with an electronic device and storing one or more computer executable instructions that, when executed by at least one processor, cause the at least one processor to:

generate a first absolute key and a first partial relative key, wherein the first absolute key and the first partial relative key define a relative identity of a first agent of the electronic device that is unique to a relationship between the first agent and a second agent of another electronic device;

receive a message from the other electronic device indicating that a communication channel is established and that an activity is about to occur on the communication channel, wherein the message includes a second partial relative key that defines a relative identity of the second agent that is unique to the relationship between the first agent and the second agent;

generate a first intermediate key based on the first absolute key, the first partial relative key, and the second partial relative key;

transmit the first intermediate key to the other electronic device;

generate a first encryption key based on the first absolute key and a second intermediate key received from the other electronic device after generating the first intermediate key;

open a secure communication channel based on a validation of the first encryption key and a validation of a second encryption key that is generated by the other electronic device, wherein the second encryption key is based on a second absolute key generated by the other electronic device and the first intermediate key, and wherein the second absolute key defines the relative identity of the second agent that is unique to the relationship between the first agent and the second agent;

receive an authentication request from the other electronic device using the secure communication channel to authenticate the activity, wherein the authentication request includes an indication of at least one activity type of the activity;

display an authentication request display that is based on the indication of the at least one activity type of the activity; and after displaying the authentication request display, transmit an authentication reply to the other electronic device using the secure communication channel for authentication and execution of the activity occurring on the communication channel.

19. The non-transitory, computer-readable storage medium of claim 18, wherein the communication channel includes a communication channel for electronic communication using a browser.

20. The non-transitory, computer-readable storage medium of claim 18, wherein the communication channel includes a communication channel for telephonic communication using a telephone.

* * * * *